United States Patent
Wang et al.

(10) Patent No.: US 11,411,699 B2
(45) Date of Patent: *Aug. 9, 2022

(54) SHARED DEMODULATION REFERENCE SIGNAL DESIGN FOR CONTROL CHANNELS IN 5G OR OTHER NEXT GENERATION NETWORKS

(71) Applicant: AT&T Intellectual Property I, L.P., Atlanta, GA (US)

(72) Inventors: Xiaoyi Wang, Austin, TX (US); SaiRamesh Nammi, Austin, TX (US); Salam Akoum, Austin, TX (US); Arunabha Ghosh, Austin, TX (US); Ralf Bendlin, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/860,761

(22) Filed: Apr. 28, 2020

(65) Prior Publication Data

US 2020/0259615 A1 Aug. 13, 2020

Related U.S. Application Data

(62) Division of application No. 15/978,319, filed on May 14, 2018, now Pat. No. 10,673,588.

(51) Int. Cl.
*H04L 27/26* (2006.01)
*H04L 5/00* (2006.01)
(Continued)

(52) U.S. Cl.
CPC .......... *H04L 5/0048* (2013.01); *H04L 5/0053* (2013.01); *H04L 27/2613* (2013.01); *H04W 4/027* (2013.01); *H04W 72/042* (2013.01)

(58) Field of Classification Search
CPC ............. H04L 5/0048; H04L 27/2613; H04W 4/027; H04W 72/042
See application file for complete search history.

(56) References Cited

U.S. PATENT DOCUMENTS 8,588,150 B2  11/2013  Luo et al.
8,873,489 B2  10/2014  Liao et al.
(Continued)

FOREIGN PATENT DOCUMENTS

CN      101868033 A      10/2010
WO      2011/085195 A1    7/2011
(Continued)

OTHER PUBLICATIONS

Non-Final Office Action received for U.S. Appl. No. 15/978,319 dated Nov. 20, 2019, 19 pages.
(Continued)

*Primary Examiner* — Brenda H Pham
(74) *Attorney, Agent, or Firm* — Amin, Turocy & Watson, LLP

(57) ABSTRACT

Facilitating shared demodulation reference signal design for control channels in a wireless communications system is provided herein. A system can comprise a processor and a memory that stores executable instructions that, when executed by the processor, facilitate performance of operations. The operations can comprise evaluating a usage parameter of a mobile device for application of channel demodulation reference signal reuse by the mobile device. In response to a first determination that the usage parameter satisfies a condition relative to a threshold usage parameter, the operations can comprise facilitating a first transmission to the mobile device to implement the channel demodulation reference signal reuse by the mobile device. In response to a second determination that the usage parameter does not satisfy the condition relative to the threshold usage param-
(Continued)

eter, the operations can comprise facilitating a second transmission to the mobile device to implement usage of separate channel demodulation reference signals.

20 Claims, 10 Drawing Sheets

(51) Int. Cl.
*H04W 4/02* (2018.01)
*H04W 72/04* (2009.01)

(56) References Cited

U.S. PATENT DOCUMENTS

| | | | |
|---|---|---|---|
| 8,934,430 B2 | 1/2015 | Zhang et al. | |
| 9,167,561 B2 | 10/2015 | Zhang | |
| 9,252,918 B2 | 2/2016 | Nory et al. | |
| 9,253,771 B2 | 2/2016 | Miao et al. | |
| 9,276,722 B2 | 3/2016 | Gaal et al. | |
| 9,444,557 B2 | 9/2016 | Aiba et al. | |
| 9,455,809 B2 | 9/2016 | Kim et al. | |
| 9,497,756 B2 | 11/2016 | Dinan | |
| 9,661,623 B2 | 5/2017 | Jiang et al. | |
| 9,716,576 B2 | 7/2017 | Chun et al. | |
| 9,730,200 B2 | 8/2017 | Qu et al. | |
| 9,769,807 B2 | 9/2017 | Jöngren et al. | |
| 10,034,292 B1* | 7/2018 | Liu | H04W 72/046 |
| 10,673,588 B2* | 6/2020 | Wang | H04L 5/0048 |
| 2014/0341180 A1 | 11/2014 | Liu et al. | |
| 2016/0226690 A1* | 8/2016 | Hessler | H04L 5/0042 |
| 2016/0315748 A1 | 10/2016 | Chen et al. | |
| 2017/0164384 A1 | 6/2017 | Wang et al. | |
| 2017/0181138 A1 | 6/2017 | Li et al. | |

FOREIGN PATENT DOCUMENTS

| | | |
|---|---|---|
| WO | 2014/113971 A1 | 7/2014 |
| WO | 2014/176967 A1 | 11/2014 |
| WO | 2015/014407 A1 | 2/2015 |
| WO | 2016/079632 A1 | 5/2016 |
| WO | 2017/201273 A1 | 11/2017 |

OTHER PUBLICATIONS

Mazzarese, "3GPP TSG_RAN_WG1_NRArchives", LISTSERV 16.0, Oct. 12, 2017, 2 pages.

ZTE, "PDCCH procedure and DCI carried by PDSCH region", 3GPP TSG RAN WG1 Meeting #88, Feb. 13-17, 2017, R1-1701588, Athens, Greece, 4 pages.

* cited by examiner

SHARED DEMODULATION REFERENCE SIGNAL DESIGN FOR CONTROL CHANNELS IN 5G OR OTHER NEXT GENERATION NETWORKS

RELATED APPLICATION

The subject patent application is divisional of, and claims priority to, U.S. patent application Ser. No. 15/978,319 (now U.S. Pat. No. 10,673,588), filed May 14, 2018, and entitled "SHARED DEMODULATION REFERENCE SIGNAL DESIGN FOR CONTROL CHANNELS IN 5G OR OTHER NEXT GENERATION NETWORKS," the entirety of which application is hereby expressly incorporated by reference herein.

TECHNICAL FIELD

The subject disclosure relates generally to communications systems, and for example, to demodulation reference signals for control channels and data traffic channels in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
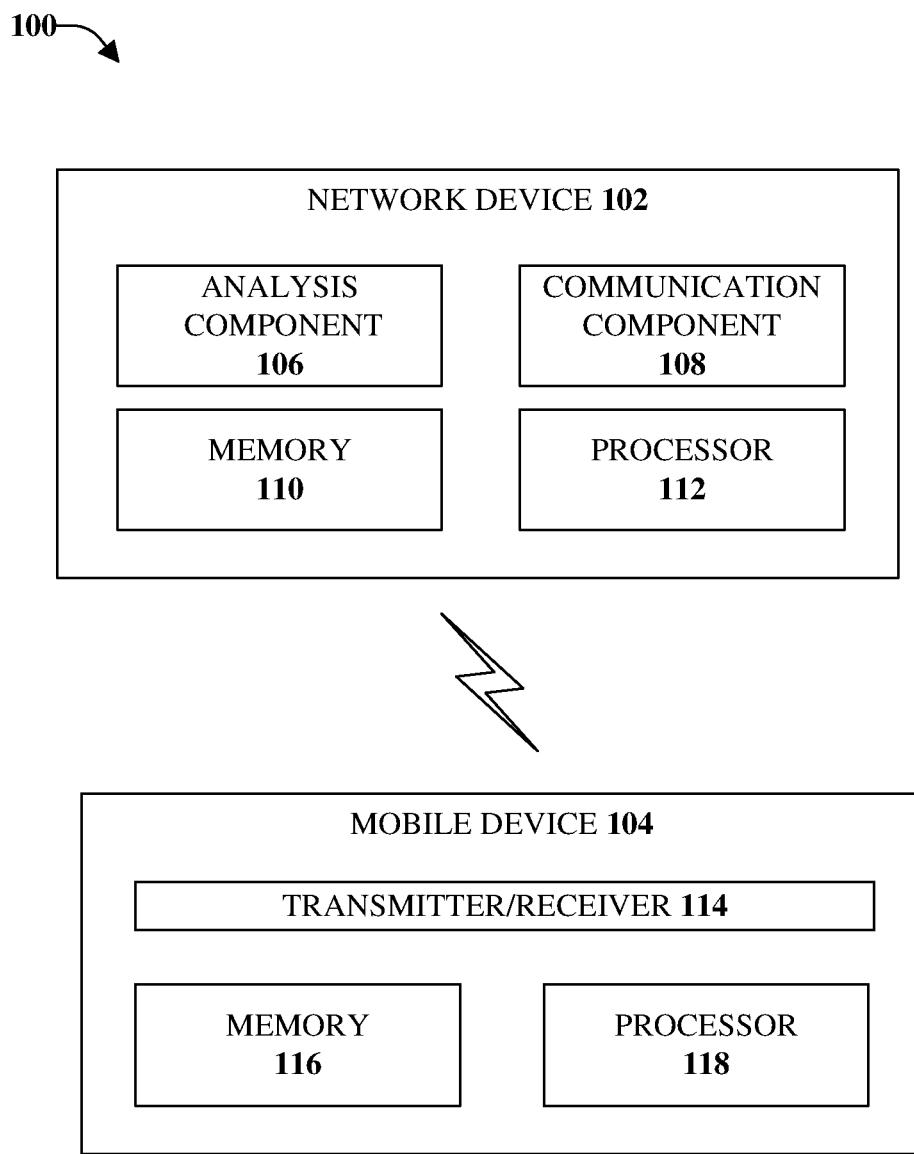
FIG. 1 illustrates a block diagram of an example, non-limiting, communications system for facilitating shared demodulation reference signal design for control channels in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

To meet the huge demand for data centric applications, 4G standards can be applied to 5G (e.g., NR access). 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In a multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel State Information Reference Signals (CSI-RS) can be used by terminals to acquire Channel State Information (CSI) and beam specific information (e.g., beam reference signal received power). In 5G, CSI-RS can be User Equipment (UE) specific so it can have a significantly lower time/frequency density. Demodulation Reference Signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the previously mentioned reference signals, there are other reference signals, namely Multi-Cast Broadcast Single Frequency Network (MBSFN) and positioning reference signals that can be used for various purposes.

Non-slot-based scheduling (also referred to as mini-slot based scheduling) has been introduced in NR to reduce the latency of the air interface. The design is to allow a short Physical Downlink Shared Channel (PDSCH) duration in such scheduling. In non-slot-based scheduling, the PDSCH duration can be very short. Currently 3GPP has agreed to support two symbols length, four symbols length, and seven symbols length (2/4/7 symbols length) of non-slot based PDSCH. With such short length of PDSCH, a demodulation reference signal (DMRS) overhead could become too big. In the worst case, a Physical Downlink Control Channel (PDCCH) DMRS and a PDSCH DMRS will occupy the first and second symbols. In the case of two symbols PDSCH duration, the leftover Resource Elements (REs) for data is very small. Non-slot-based scheduling utilizes fourteen symbols (e.g., 14 OFDM symbols).

The disclosed aspects can be utilized with both slot-based scheduling and non-slot-based scheduling. Further, the various aspects provided herein can provide a new DMRS table design that can support adaptive DMRS table switching according to a PDSCH duration length. Also provided herein is a dynamic indication of whether PDCCH DMRS can be reused for a PDSCH channel estimation.

In an embodiment, described herein is a system that can comprise a processor and a memory that stores executable instructions that, when executed by the processor, facilitate performance of operations. The operations can comprise evaluating a usage parameter of a mobile device for application of channel DMRS reuse by the mobile device. In response to a first determination that the usage parameter satisfies a condition relative to a threshold usage parameter, the operations can comprise facilitating a first transmission to the mobile device to implement the channel DMRS reuse by the mobile device. In response to a second determination that the usage parameter does not satisfy the condition relative to the threshold usage parameter, the operations can comprise facilitating a second transmission to the mobile device to implement usage of separate channel DMRS's. The channel DMRS reuse can be implemented for slot-based scheduling and/or for non-slot-based scheduling.

The channel DMRS reuse can comprise a PDCCH DMRS being reused for PDSCH estimation. According to an example, the second transmission can comprise an indication for the mobile device to utilize a first DMRS for a data channel and a second DMRS for a control channel.

Facilitating the first transmission can comprise transmitting an indication to implement the channel DMRS reuse as a separate encoded bit in a signal that comprises downlink control information. In another example, facilitating the first transmission can comprise transmitting an indication to implement the channel DMRS reuse as a jointly encoded bit in a DMRS port table that comprises a group of indication bits including the jointly encoded bit.

In an example, the usage parameter can be a speed of the mobile device and the threshold usage parameter can be a threshold movement speed of the mobile device. In accordance with this example, the operations can further comprise, in response to a third determination that the speed of the mobile device is less than the threshold movement speed, determining that the channel DMRS reuse is to be implemented at the mobile device. Further, in response to a fourth determination that the speed of the mobile device is more than the threshold movement speed, the operations can comprise determining that separate channel DMRS's are to be implemented at the mobile device.

In another example, the usage parameter can be rank data of the mobile device and the threshold usage parameter can be a threshold rank data of the mobile device. According to this example, the operations can further comprise, in response to a third determination that the rank data is less than the threshold rank data, determining that the channel DMRS reuse is to be implemented at the mobile device. Further, in response to a fourth determination that the rank data is more than the threshold rank data, the operations can comprise determining that separate channel DMRS's are to be implemented at the mobile device.

According to another example, the usage parameter can be a duration of a PDSCH and the operations can comprise facilitating a third transmission of a DMRS port table selected from a group of DMRS port tables based on the duration of the PDSCH. The DMRS port table can comprise an indication for the mobile device to implement the channel DMRS reuse.

According to another embodiment is a method that can comprise determining, by a network device of a wireless network, that a usage parameter associated with a mobile device in the wireless network satisfies a function of a defined usage parameter associated with control channel DMRS reuse. The network device can comprise a processor. The method can also comprise in response to a determination that the usage parameter satisfies the function of the defined usage parameter, transmitting, by the network device to the mobile device, an indication of usage of a shared DMRS for a data channel and a control channel.

In an example, the indication can be a first indication. Further to this example, the method can comprise, in response to determining the usage parameter fails to satisfy the defined usage parameter, transmitting, by the network device and to the mobile device, a second indication of usage of a first DMRS for the data channel and a second DMRS for the control channel. The first DMRS and the second DMRS can be separate DMRS's.

In accordance with an example, transmitting the indication can comprise transmitting the indication as a separate encoded bit in a signal that comprises downlink control information.

In another example, the determination is a first determination, and the usage parameter is a movement speed of the mobile device. Further to this example, the method can comprise measuring, by the network device, the movement speed of the mobile device and comparing, by the network device, the movement speed with a defined movement speed parameter. The method can also comprise, in response to a second determination that the movement speed is less than the defined movement speed parameter, determining, by the network device, that the shared DMRS is available for use by the mobile device.

According to another example, the determination can be a first determination and the usage parameter can be rank data. In accordance with this example, the method can comprise evaluating, by the network device, the rank data associated with the mobile device. The method can also comprise, in response to a second determination that the rank data is rank one, determining, by the network device, that the shared DMRS is available for use by the mobile device.

In another example, the usage parameter can be a duration of a PDSCH and the method can comprise determining, by the network device, the duration of the PDSCH. The method can also comprise transmitting, by the network device to the mobile device, a DMRS port table based on the duration of the PDSCH. The DMRS port table can comprise the indication for the mobile device to use the shared DMRS for the data channel and the control channel.

According to yet another embodiment, described herein is a machine-readable storage medium, comprising executable instructions that, when executed by a processor, facilitate performance of operations. The operations can comprise evaluating a usage parameter of a mobile device for application of channel DMRS reuse by the mobile device. The operations can also comprise, in response to a first determination that the usage parameter satisfies a threshold usage parameter, facilitating a first transmission to the mobile device to be used for implementation of the channel DMRS reuse. Further, the operations can comprise, in response to a second determination that the usage parameter does not satisfy the threshold usage parameter, facilitating a second transmission to the mobile device to be used for implementation of separate channel DMRS's. In an example, the channel DMRS reuse can comprise a PDCCH DMRS being reused for PDSCH estimation.

According to an implementation, the operations can comprise determining a duration of a PDSCH. The operations can also comprise facilitating a third transmission to the mobile device, the third transmission can comprise a DMRS port data structure based on the duration of the PDSCH. The DMRS port data structure can comprise an indication for the mobile device to implement the channel DMRS reuse. These and other embodiments or implementations are described in more detail below with reference to the drawings.

FIG. 1 illustrates a block diagram of an example, non-limiting, communications system 100 for facilitating shared DMRS design for control channels in accordance with one or more embodiments described herein. The communications system 100 can comprise one or more network devices (illustrated as a network device 102) and one or more mobile devices (illustrated as a mobile device 104). The network device 102 can be included in a group of network devices of a wireless network. Although only a single mobile device and a single network device are illustrated, the communications system 100 can comprise a multitude of mobile devices and/or a multitude of network devices.

The network device 102 can comprise an analyzer, illustrated as an analysis component 106, a transmitter/receiver, illustrated as a communication component 108, at least one memory 110, and at least one processor 112. Further, the mobile device 104 can comprise a transmitter/receiver 114, at least one memory 116, and at least one processor 118.

The network device 102, via the communication component 108, can communicate with the mobile device 104, via the transmitter/receiver 114. For example, the network device 102 can communicate reference signal data associated with a reference signal to the mobile device 104. In addition, the network device 102, via the communication component 108, and the mobile device 104, via the transmitter/receiver 114 can communicate with other network devices and/or other mobile devices.

The analysis component 106 can determine whether a usage parameter of the mobile device 104 satisfies a defined usage parameter. For example, the usage parameter can be a movement speed of the mobile device 104 and the defined usage parameter can be a defined movement speed. The movement speed can indicate how fast the mobile device 104 is being moved.

In another example, the usage parameter can be a rank data of the mobile device and the defined usage parameter can be a defined rank information parameter. Rank data, or rank information, comprises various combinations of the number of transmit antennas and the number of transmission layers. Channel rank information is a second order statistic of the channel and does not change fast, unlike precoding matrix or Channel Quality Index (CQI) information. The channel rank information can be reported by the mobile device 104 as feedback information. The rank information can include a rank indicator, which indicates the number of streams of information preferred by the mobile device.

In yet another example, the usage parameter can be a duration of a PDSCH. Further, the defined usage parameter can be whether the duration comprises two symbols length, four symbols length, seven symbols length, or fourteen symbols length.

The communication component 108 can be configured to transmit, to the mobile device 104, an indication related to whether a shared DMRS should be used for a data channel and a control channel, or whether separate DMRS's should be used for the data channel and the control channel.

The communication component 108 and/or the transmitter/receiver 114 can be configured to transmit to and/or receive data from the network device 102, the mobile device 104, other network devices, and/or other mobile devices. Through the communication component 108, the network device 102 can concurrently transmit and receive data, can transmit and receive data at different times, or combinations thereof. In a similar manner, through the transmitter/receiver 114, the mobile device 104 can concurrently transmit and receive data, can transmit and receive data at different times, or combinations thereof.

The respective one or more memories (e.g., the memory 110, the memory 116) can be operatively coupled to the respective one or more processors (e.g., the processor 112, the processor 118). The respective one or more memories (e.g., the memory 110, the memory 116) can store protocols associated with facilitation of shared DMRS design as discussed herein. Further, the respective one or more memories (e.g., the memory 110, the memory 116) can facilitate action to control communication between the network device 102 and the mobile device 104, such that the communications system 100 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors (e.g., the processor 112, the processor 118) can facilitate respective analysis of information related to facilitation of shared DMRS design in a communication network. The processors (e.g., the processor 112, the processor 118) can be processors dedicated to analyzing and/or generating information received, processors that control one or more components of the communications system 100, and/or processors that both analyze and generate information received and control one or more components of the communications system 100.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., Universal Mobile Telecommunications System (UMTS) networks), network devices can be referred to as Base Transceiver Stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 102) can include but are not limited to: NodeB devices, Base Station (BS) devices, Access Point (AP) devices, TRPs, and Radio Access Network (RAN) devices. The network nodes can also include Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in a Distributed Antenna System (DAS), and the like.

The communications system 100 can be configured to dynamically change a DMRS port table according to the duration of PDSCH. For example, the network device 102 (e.g., a gNB) can configure the mobile device 104 with one DMRS port table selected from a group of DMRS port tables. Respective DMRS port tables in the group of DMRS port tables can be associated with a particular length of the PDSCH duration. As DCI indicates the PDSCH duration information, the network device 102 can dynamically switch the DMRS table used for a current PDSCH. Table 1 below illustrates an example, non-limiting, table for a PDSCH having a duration of two symbols, only a single codeword, and non-slot-based scheduling. As illustrated in Table 1, a value of 0 can indicate a message to reuse the DMRS with PDCCH. Thus, a shared DMRS can be utilized for this example port table.

TABLE 1

Table for PDSCH duration of 2 symbols Only single codeword

| Value | Message |
|---|---|
| 0 | 1 layer<br>Reuse DMRS with PDCCH DMRS port-xx |
| 1 | 1 layer, port 7 with Nscid = 0<br>Separate PDSCH DMRS |
| 2 | 1 layer, port 8 with Nscid = 0<br>Separate PDSCH DMRS |
| 3 | 1 layer, port 7 with Nscid = 1<br>Separate PDSCH DMRS |
| 4 | 1 layer, port 8 with Nscid = 1<br>Separate PDSCH DMRS |
| 5 | 2 layers, port 7, 8<br>Separate PDSCH DMRS |
| 6 | 2 layers, port 9, 10<br>Separate PDSCH DMRS |
| 7 | Reserved |

Table 2 below illustrates an example, non-limiting, table for a PDSCH having a duration of four symbols, only a single codeword, and non-slot-based scheduling. As illustrated in Table 2, a value of 0 can indicate a message to reuse the DMRS with PDCCH. Thus, a shared DMRS can be utilized for this example port table.

TABLE 2

Table for PDSCH duration of 4 symbols Only single codeword

| Value | Message |
|---|---|
| 0 | 1 layer<br>Reuse DMRS with PDCCH DMRS port-xx |
| 1 | 1 layer, port 7 with Nscid = 0<br>Separate PDSCH DMRS |
| 2 | 1 layer, port 8 with Nscid = 0<br>Separate PDSCH DMRS |
| 3 | 1 layer, port 7 with Nscid = 1<br>Separate PDSCH DMRS |
| 4 | 1 layer, port 8 with Nscid = 1<br>Separate PDSCH DMRS |
| 5 | 2 layers, ports 7-8<br>Separate PDSCH DMRS |

TABLE 2-continued

Table for PDSCH duration of 4 symbols Only single codeword

| Value | Message |
|---|---|
| 6 | 3 layers, ports 7-9 Separate PDSCH DMRS |
| 7 | 4 layers, ports 7-10 |

Table 3 below illustrates an example, non-limiting, table for a PDSCH having a duration of seven symbols, and only a single codeword, up to rank 4, and non-slot-based scheduling. As illustrated in Table 3, a value of 0 can indicate a message to reuse the DMRS with PDCCH. Thus, a shared DMRS can be utilized for this example port table.

TABLE 3

Table for mini-slot duration 7 symbols
Only single codeword (up to rank 4)

| Value | Message |
|---|---|
| 0 | 1 layer Reuse DMRS with PDCCH DMRS port-xx |
| 1 | 1 layer, port 7 Separate PDSCH DMRS |
| 2 | 1 layer, port 8 Separate PDSCH DMRS |
| 3 | 2 layers, ports 7-8 Separate PDSCH DMRS |
| 4 | 2 layers, ports 9-10 Separate PDSCH DMRS |
| 5 | 3 layers, ports 7-9 Separate PDSCH DMRS |
| 6 | 4 layers, ports 7-10 Separate PDSCH DMRS |
| 7 | Reserved |

According to an alternative, or additional, implementation, a dynamic indication can be provided by the network device 102, in the DCI, to notify the mobile device 104 to use shared DMRS or whether a separate DMRS should be used. The detail signaling can be a separately encoded bit in the DCI or can be jointly encoded in the DMRS port indication bits. The above tables (e.g., Table 1, Table 2, and Table 3) consider the jointly encoded case where one entry of the DMRS table can be used to indicate the shared DMRS case where the mobile device 104 can assume the PDCCH DMRS is reused for PDSCH channel estimation.

When shared DMRS between PDCCH and PDSCH is indicated, the mobile device 104 can perform channel estimation based on PDCCH DMRS and can infer the channel to PDSCH data REs with the assumption of using the same precoder at transmission side. In addition, the mobile device 104 can assume the PDCCH DMRS is transmitted with the same bandwidth of PDSCH resource allocation.

Figure 2:
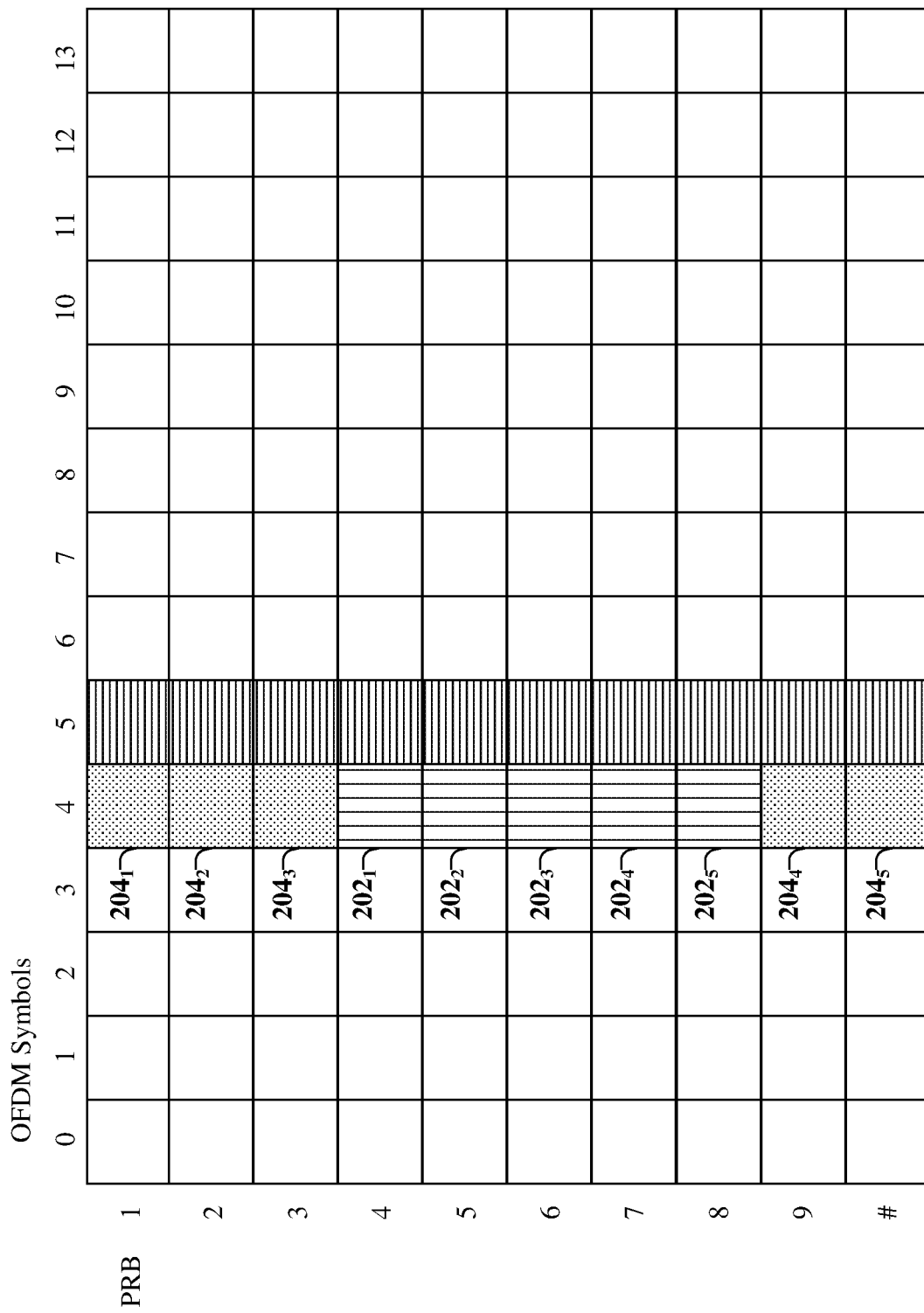
FIG. 2 illustrates an example, non-limiting representation of a separate demodulation reference signal using an example of 2-symbols non-slot-based scheduling in accordance with one or more embodiments described herein.

FIG. 2 illustrates an example, non-limiting representation of a separate DMRS using an example of 2-symbols non-slot-based scheduling in accordance with one or more embodiments described herein. It is noted that although this is an example of 2-symbols, a similar principle can be utilized for other durations.

The horizontal axis represents the OFDM symbols (e.g., 14 symbols, labeled 0 through 13). The vertical axis represents the Physical Resource Block (PRB). As indicated, for this example, during OFDM symbol 4, PDCCH PRBs with DMRS $202_1$, $202_2$, $202_3$, $202_4$, and 2025 can be transmitted as PRB 4, 5, 6, 7, and 8. Further, during OFDM symbol 4, PDSCH PRBs without DMRS $204_1$, $204_2$, $204_3$, $204_4$, and $204_5$ can be transmitted as PRB 1, PRB 2, PRB 3, PRB 9, through PRB #. Further to this example, during OFDM symbol 5, all PRBS comprise PDSCH PRB with DMRS.

Figure 3:
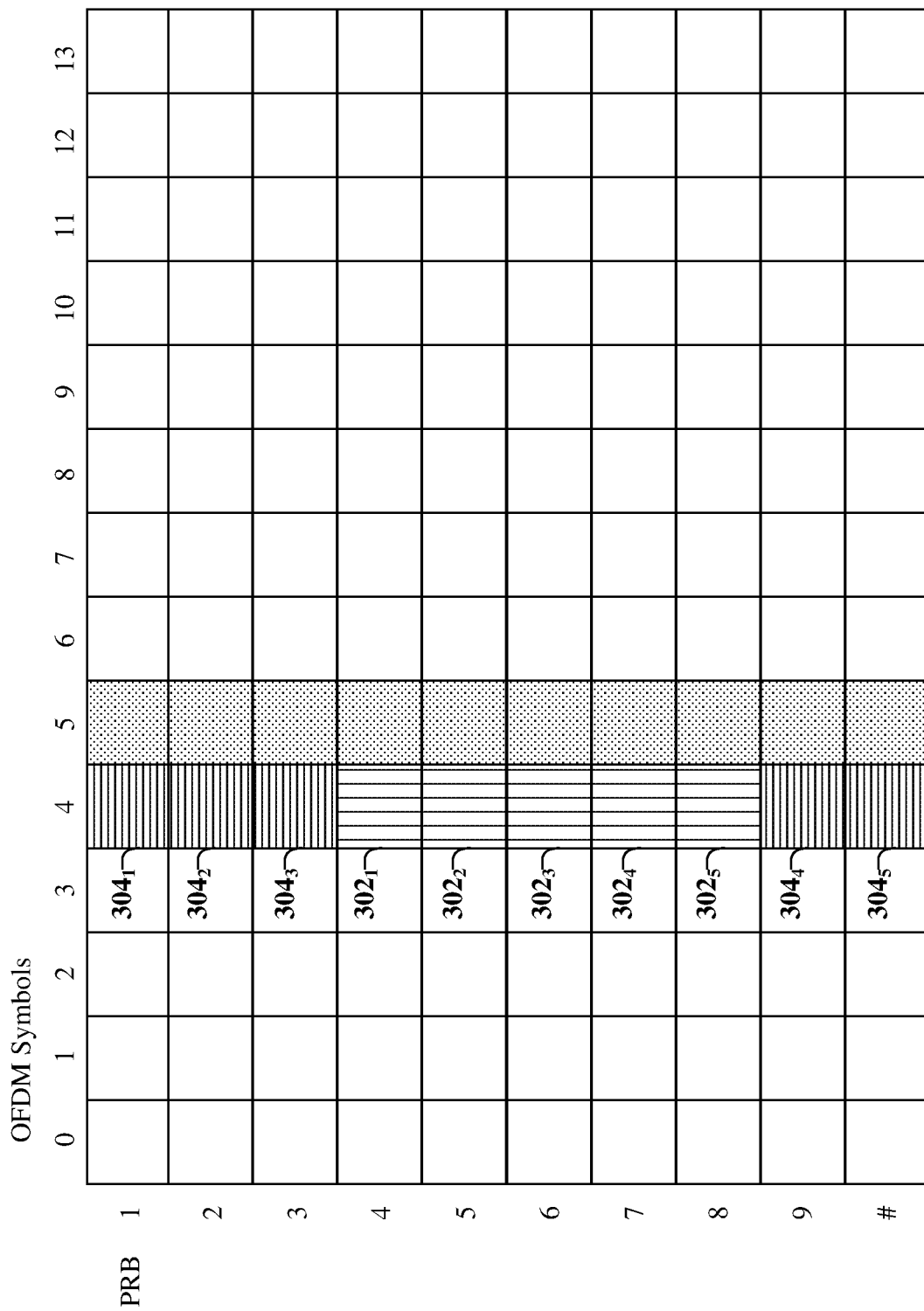
FIG. 3 illustrates an example, non-limiting representation of a shared demodulation reference signal using an example of 2-symbols non-slot-based scheduling in accordance with one or more embodiments described herein.

FIG. 3 illustrates an example, non-limiting representation of a shared DMRS using an example of 2-symbols non-slot-based scheduling in accordance with one or more embodiments described herein. Repetitive description of like elements employed in other embodiments described herein is omitted for sake of brevity. It is noted that although this is an example of 2-symbols, a similar principle can be utilized for other durations.

The horizontal axis represents the OFDM symbols (e.g., 14 symbols, labeled 0 through 13). The vertical axis represents the Physical Resource Block (PRB). As indicated, for this example, during OFDM symbol 4, PDCCH PRBs with DMRS $302_1$, $302_2$, $302_3$, $302_4$, and $302_5$ can be transmitted as PRB 4, 5, 6, 7, and 8. Further, during OFDM symbol 4, PDSCH PRBs with DMRS $304_1$, $304_2$, $304_3$, $304_4$, and $304_5$ can be transmitted as PRB 1, PRB 2, PRB 3, PRB 9, through PRB #. Further to this example, during OFDM symbol 5, all PRBs comprise PDSCH PRB without DMRS. Accordingly, FIG. 2 and FIG. 3 illustrate the difference of separate DMRS (FIG. 2) and shared DMRS (FIG. 3).

Figure 4:
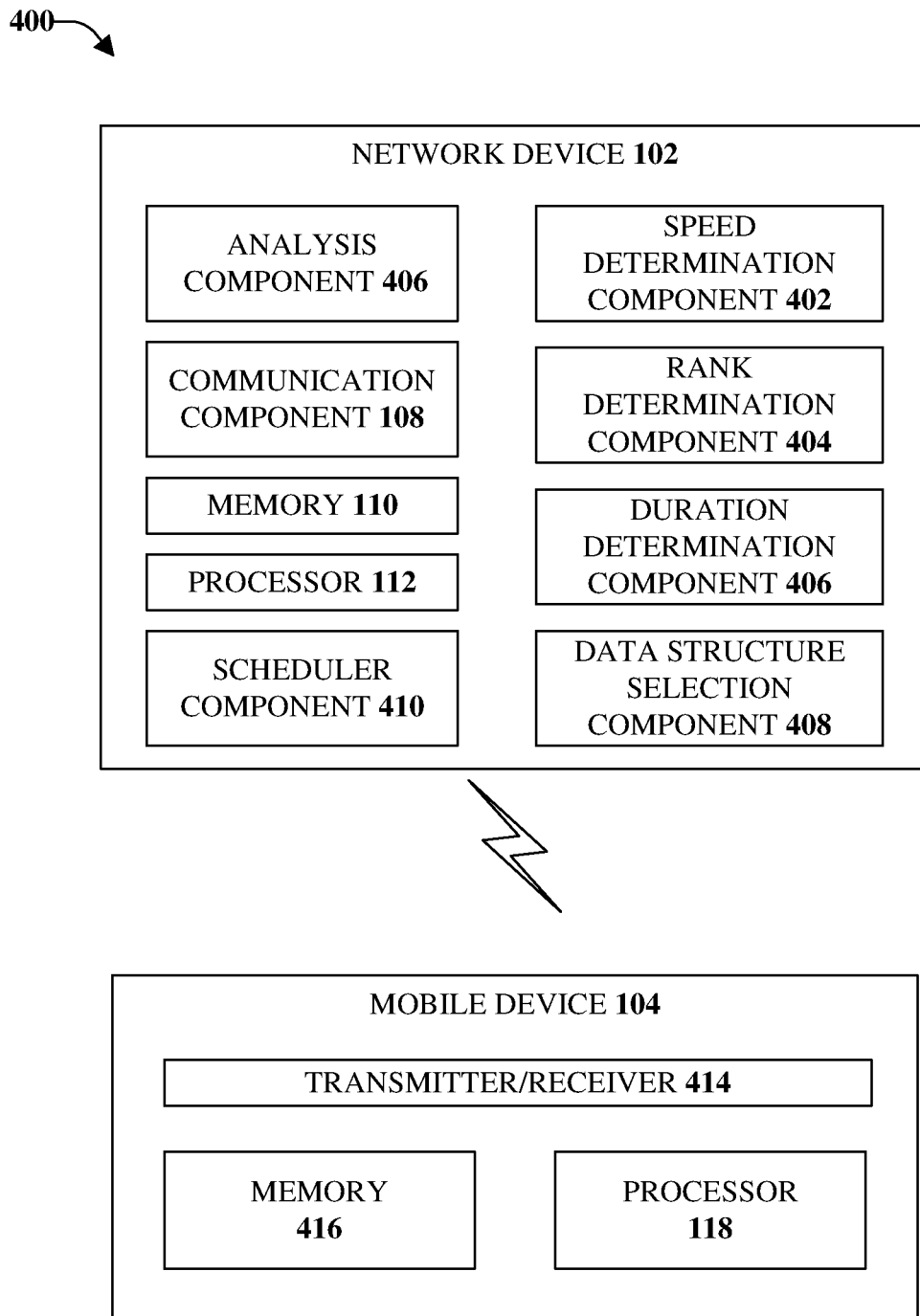
FIG. 4 illustrates a block diagram of an example, non-limiting, communications system for dynamically switching between shared demodulation reference signals and separated demodulation reference signals in accordance with one or more embodiments described herein.

FIG. 4 illustrates a block diagram of an example, non-limiting, communications system 400 for dynamically switching between shared DMRS and separated PDSCH DMRS in accordance with one or more embodiments described herein. Repetitive description of like elements employed in other embodiments described herein is omitted for sake of brevity. The communications system 400 can comprise one or more of the components and/or functionality of the communications system 100, and vice versa.

The analysis component 106 can evaluate a usage parameter of the mobile device 104 for application of channel DMRS reuse by the mobile device 104. The usage parameter can be one or more of a speed of the mobile device 104, a rank data of the mobile device 104, and a duration of a PDSCH.

Based on the usage parameter being a speed of the mobile device, a speed determination component 402 can measure a current movement speed of the mobile device 104. The analysis component 106 can compare the current movement speed to ranges of speeds (e.g., speeds between the ranges of 0 miles per hour (mph) and 1 mph, 1 mph and 3 mph; 3 mph and 7 mph, and so on; speeds less than 10 miles per hour, between 10 and 70 miles per hour, over 70 miles per hour, and so on). Thus, the analysis component 106 can determine if the mobile device is moving at a low speed or a high speed. In response to a determination that the speed of the mobile device is less than the threshold movement speed, the analysis component 106 can determine that the channel DMRS reuse is to be implemented at the mobile device 104. In this case, the communication component 108 can facilitate a first transmission to the mobile device 104 to implement the channel DMRS reuse by the mobile device.

However, if the mobile device is moving at a high speed, the network device 102 can configure the mobile device 104 to utilize the separate DMRS. Thus, in response to another determination that the speed of the mobile device 104 is more than the threshold movement speed, the analysis component 106 can determine that separate channel DMRS's are to be implemented at the mobile device 104. The communication component 108 can facilitate a second transmission to the mobile device to implement usage of separate channel DMRS's.

Based on the usage parameter being rank data of the mobile device, a rank determination component 404 can determine the rank data of the mobile device 104. If the rank data is less than the threshold rank data, the analysis component 106 can determine that channel DMRS reuse is to be implemented at the mobile device 104 and the communication component 108 can facilitate a first transmission to the mobile device 104 to implement the channel DMRS reuse by the mobile device. However, if the rank data is more than the threshold rank data, the analysis component 106 can determine that separate channel DMRS's are to be implemented at the mobile device 104 and the communication component 108 can facilitate a second transmission to the mobile device to implement usage of separate channel DMRS's.

Further, in some implementations, the usage parameter can be a duration of a PDSCH, which can be evaluated by a duration determination component 406. Thus, the communication component 108 can transmit a DMRS port table selected from a group of DMRS port tables based on the duration of the PDSCH. The DMRS port table can comprise an indication for the mobile device to implement the channel DMRS reuse.

Prior to transmission by the communication component 108, in some implementations, a data structure selection component 408 can select a data structure from a group of data structures (e.g., the example tables (Table 1, Table 2, and Table 3) provided above. The selected data structure can provide an indication of whether DMRS reuse should be utilized or whether separate DMRS should be utilized.

An advantage of the disclosed aspects comprises a DMRS table that can be adaptively selected (e.g., by the network device 102, by the data structure selection component 408) according to the duration of non-slot-based scheduling. Another advantage is that the disclosed aspects can support dynamically switching between shared DMRS and separated PDSCH DMRS. For example, when a gNB scheduler (e.g., a scheduler component 410 of the network device 102) knows the current scheduling fulfills the condition to share DMRS between PDSCH and PDCCH, the scheduler component 410 can dynamically turn-on the shared DMRS between PDCCH and PDSCH. Otherwise the scheduler component 410 can turn off the shared DMRS between PDCCH and PDSCH.

Figure 5:
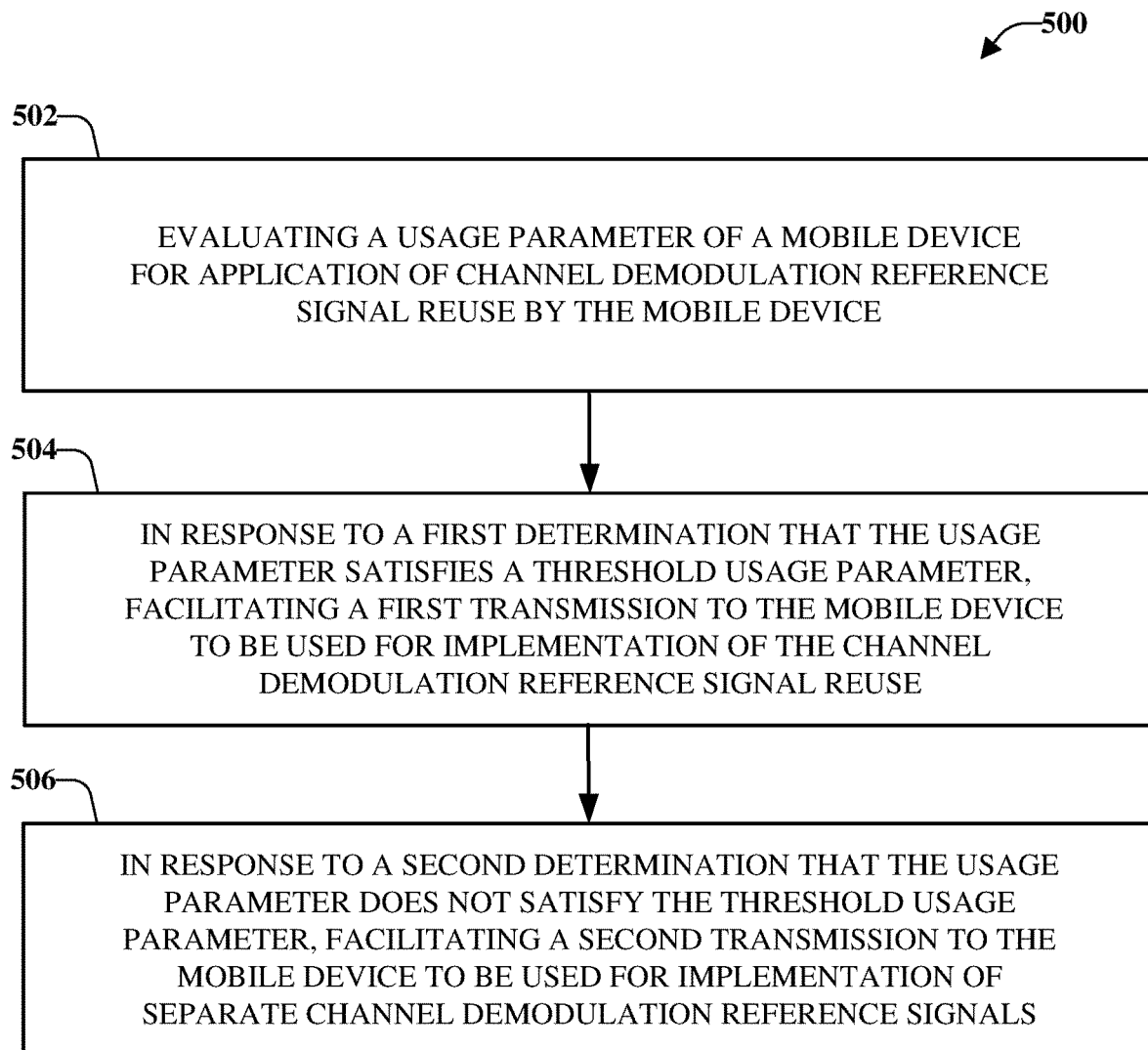
FIG. 5 illustrates an example, non-limiting, method for shared demodulation reference signal design for control channels in accordance with one or more embodiments described herein.

FIG. 5 illustrates an example, non-limiting, method 500 for shared DMRS design for control channels in accordance with one or more embodiments described herein. Repetitive description of like elements employed in other embodiments described herein is omitted for sake of brevity. The method 500 can be implemented by a network device of a wireless network, the network device comprising a processor. Alternatively, or additionally, a machine-readable storage medium can comprise executable instructions that, when executed by a processor, facilitate performance of operations for the method 500.

At 502 a usage parameter of a mobile device can be evaluated for application of channel DMRS reuse by the mobile device (e.g., via the analysis component 106). For example, the evaluation can include determining whether the usage parameter satisfies a threshold usage parameter or does not satisfy the threshold usage parameter. The threshold usage parameter can be determined a priori.

In response to a first determination that the usage parameter satisfies a threshold usage parameter, at 504, a first transmission can be sent to the mobile device to be used for implementation of the channel DMRS reuse (e.g., via the communication component 108). Thus, if the threshold usage parameter is satisfied, the shared DMRS can be utilized by the mobile device. The channel DMRS reuse can comprise a PDCCH DMRS being reused for PDSCH estimation. Further the channel DMRS reuse can be implemented for both slot based scheduling and non-slot-based scheduling.

In accordance with an implementation, the first transmission can comprise transmitting an indication to implement the channel DMRS reuse as a separate encoded bit in a signal that comprises downlink control information. According to another implementation, the first transmission can comprise transmitting an indication to implement the channel DMRS reuse as a jointly encoded bit in a DMRS port table that comprises a group of indication bits including the jointly encoded bit.

Alternatively, in response to a second determination that the usage parameter does not satisfy the threshold usage parameter, at 506, a second transmission can be sent to the mobile device to be used for implementation of separate channel DMRS's (e.g., via the communication component 108). For example, the second transmission can comprise an indication for the mobile device to utilize a first DMRS for a data channel and a second DMRS for a control channel.

Figure 6:
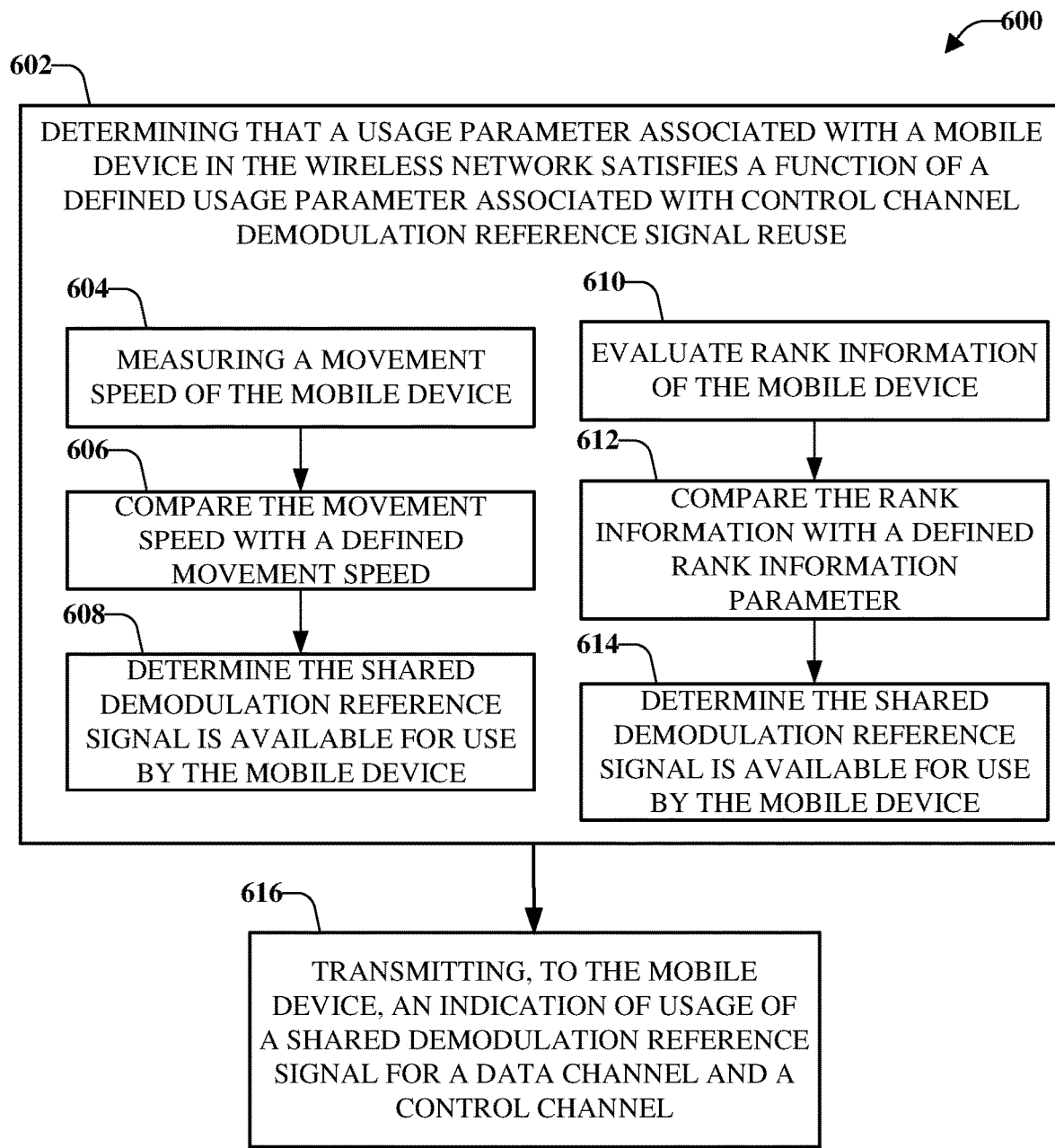
FIG. 6 illustrates an example, non-limiting, method for provisioning a mobile device to use a shared demodulation reference signal design or a separate demodulation reference signal design for control channels in accordance with one or more embodiments described herein.

FIG. 6 illustrates an example, non-limiting, method 600 for provisioning a mobile device to use a shared DMRS design or a separate DMRS design for control channels in accordance with one or more embodiments described herein. Repetitive description of like elements employed in other embodiments described herein is omitted for sake of brevity. The method 600 can be implemented by a network device of a wireless network, the network device comprising a processor. Alternatively, or additionally, a machine-readable storage medium can comprise executable instructions that, when executed by a processor, facilitate performance of operations for the method 600.

At 602, it can be determined that a usage parameter associated with a mobile device in a wireless network satisfies a function of a defined usage parameter associated with control channel DMRS reuse (e.g., via the analysis component 106).

According to an implementation, the determination at 602 can include measuring a movement speed of the mobile device, at 604 (e.g., via the speed determination component 402). The movement speed of the mobile device can be a current speed, which can fluctuate over time and can be measured at defined intervals, continually, periodically, or based on other time parameters. The current movement speed (e.g., the measured movement speed) can be compared, at 606, with a defined movement speed parameter (e.g., via the analysis component 106). Based on a determination that the movement speed is less than the defined movement speed parameter, at 608, it can be determined that the shared DMRS is available for use by the mobile device (e.g., via the analysis component 106).

According to another implementation, the determination at 602 can include evaluating channel rank data of the mobile device, at 610 (e.g., via the rank determination component 404). Rank data, or rank information, comprises various combinations of the number of transmit antennas and the number of transmission layers. Channel rank information is a second order statistic of the channel and does not change fast, unlike precoding matrix or CQI information. The channel rank information can be reported by the mobile device as feedback information. The rank information can include a rank indicator, which indicates the number of streams of information preferred by the mobile device.

Further to this implementation, the channel rank information can be compared, at 612, with a defined channel rank information parameter, such as rank one, for example (e.g., via the analysis component 106). There can be more than one channel rank information parameter, which can correspond to the rank indicator included in the channel rank information. Based on a determination that the rank data is rank one, at 614, the shared DMRS can be determined to be available for use by the mobile device (e.g., via the analysis component 106).

In response to a determination (at 608 and/or at 614) that the usage parameter satisfies the function of the defined usage parameter, at 604 an indication of usage of a shared DMRS for a data channel and a control channel can be transmitted to the mobile device (e.g., via the communication component 108).

Figure 7:
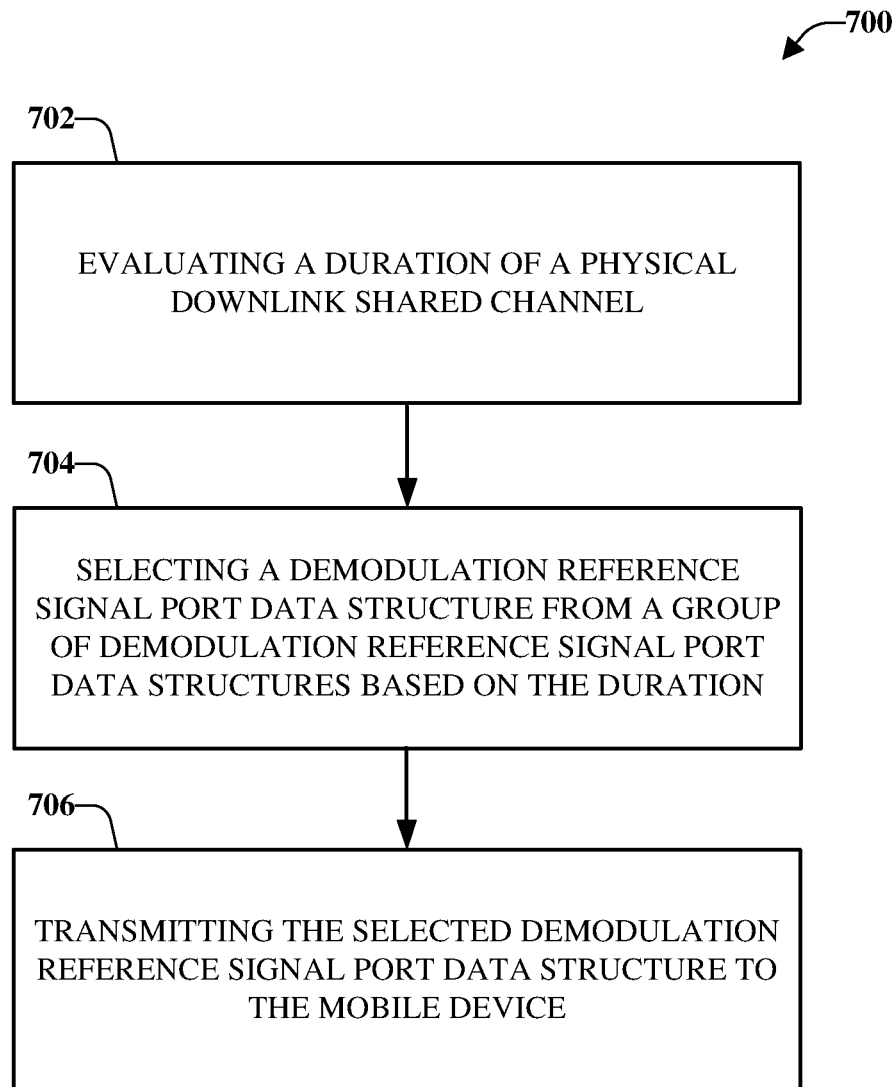
FIG. 7 illustrates an example, non-limiting, method for utilization of an adaptive demodulation reference signal port table in accordance with one or more embodiments described herein.

FIG. 7 illustrates an example, non-limiting, method 700 for utilization of an adaptive DMRS port table in accordance with one or more embodiments described herein. Repetitive description of like elements employed in other embodiments described herein is omitted for sake of brevity. The method 700 can be implemented by a network device of a wireless network, the network device comprising a processor. Alternatively, or additionally, a machine-readable storage medium can comprise executable instructions that, when executed by a processor, facilitate performance of operations for the method 700.

At 702, a duration of a PDSCH can be evaluated (e.g., via the duration determination component 406). For example, the duration can be based on either non-slot based scheduling or slot based scheduling (e.g., two symbols, four symbols, seven symbols, fourteen symbols). Based on the duration, a DMRS port data structure (e.g., a port table) can be selected from a group of DMRS port data structure, at 704 (e.g., via the data structure selection component 408). For example, port data structures in the group of port data structures can be associated with respective lengths of a PDSCH duration. For example, a first data structure can be associated with a first length, a second data structure can be associated with a second table, a third data structure can be associated with a third data structure, and so on.

The selected DMRS port data structure can be transmitted to the mobile device, at 706 (e.g., via the communication component 108). The DMRS port table can comprise the indication for the mobile device to use the shared DMRS for the data channel and the control channel. Alternatively, the DMRS port table can comprise the indication for the mobile device to use separate DMRS's for the data channel and the control channel.

Figure 8:
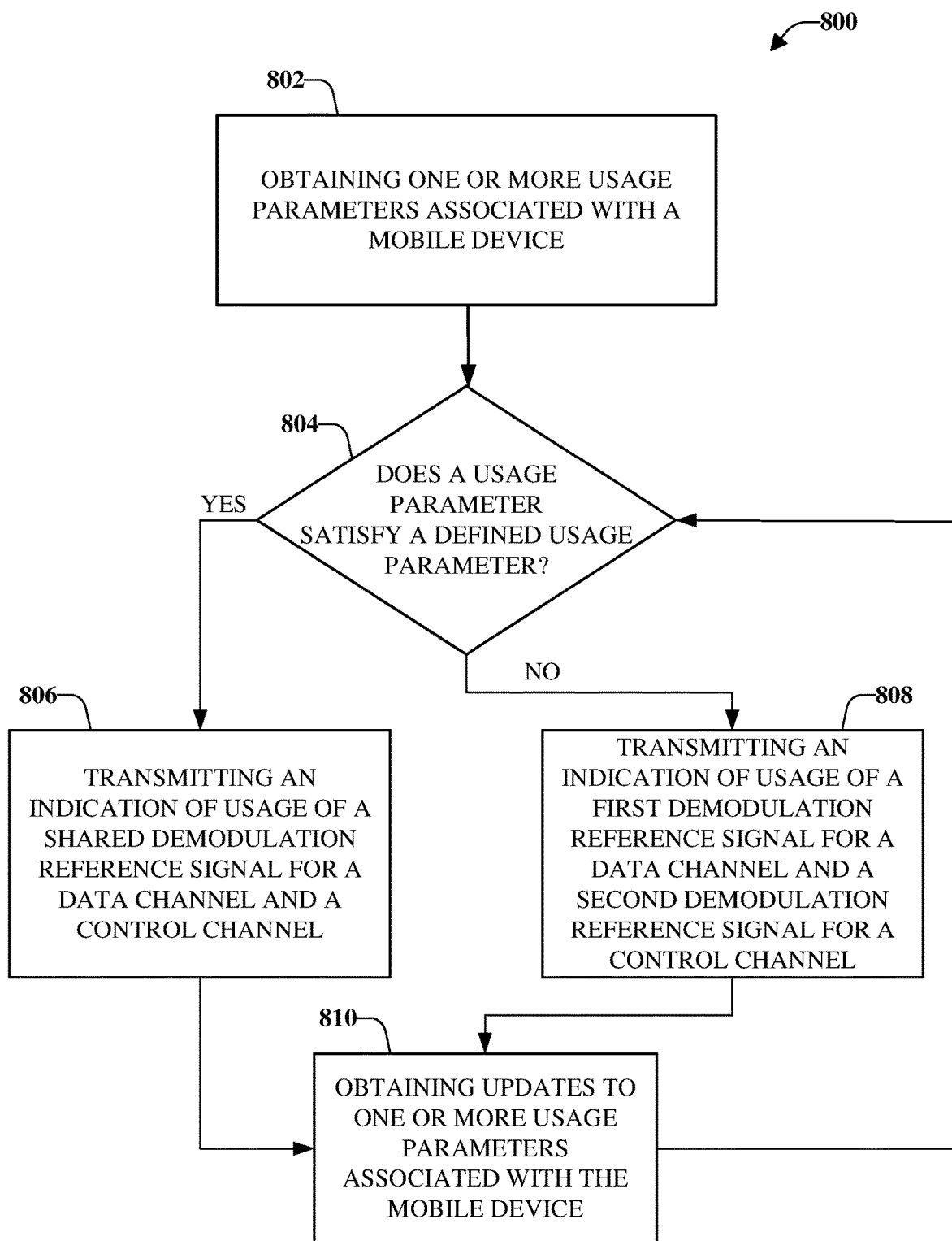
FIG. 8 illustrates an example, non-limiting, method for dynamically supporting sharing of demodulation reference signal between control channels and data channels based on a feedback loop in accordance with one or more embodiments described herein.

FIG. 8 illustrates an example, non-limiting, method 800 for dynamically supporting sharing of DMRS between control channels and data channels based on a feedback loop in accordance with one or more embodiments described herein. Repetitive description of like elements employed in other embodiments described herein is omitted for sake of brevity. The method 800 can be implemented by a network device of a wireless network, the network device comprising a processor. Alternatively, or additionally, a machine-readable storage medium can comprise executable instructions that, when executed by a processor, facilitate performance of operations for the method 800.

One or more usage parameters of a mobile device can be obtained at 802 (e.g., via the communication component 108 or another system component). Usage parameters can include a movement speed of the mobile device (e.g., how fast the mobile device is being moved), a rank information of the mobile device and/or a duration of a PDSCH.

At 804 a determination is made whether a usage parameter satisfies a defined usage parameter (e.g., via the analysis component 106). For example, the usage parameter can be a speed of the mobile device and the defined usage parameter can be based on whether the speed is a low speed (e.g., mobile device is stationary, a user of the mobile device is walking or traveling at a slow speed in a vehicle) or whether the speed is a high speed (e.g., vehicle is moving at a high rate of speed, such as on a freeway, mobile device is on a train or in a plane). In other examples, the usage parameter can be a rank of the mobile device and/or a duration of a PDSCH.

If the usage parameter satisfies the defined usage parameter ("YES"), at 806, an indication of usage of a shared DMRS for a data channel and a control channel can be transmitted to the module device (e.g., via the communication component 108). In an example, the indication can be transmitted as a separate encoded bit in a signal that comprises downlink control information. In another example, the indication can be transmitted as a jointly encoded bit in a DMRS port table that comprises a group of indication bits including the jointly encoded bit. In yet another example, the indication can be transmitted as a separate encoded bit in a signal that comprises downlink control information.

If the usage parameter does not satisfy the defined usage parameter ("NO"), at 808, an indication of usage of a separate DMRS's for a data channel and a control channel can be transmitted to the module device (e.g., via the communication component 108). For example, the indication can inform the mobile device to use a first DMRS for the data channel and a second DMRS for a control channel, where the first DMRS and the second DMRS are separate signals.

In an example, the indication can be transmitted as a separate encoded bit in a signal that comprises downlink control information. In another example, the indication can be transmitted as a jointly encoded bit in a DMRS port table that comprises a group of indication bits including the jointly encoded bit. In yet another example, the indication can be transmitted as a separate encoded bit in a signal that comprises downlink control information.

At 810, one or more updates to the one or more usage parameters can be obtained (e.g., via the communication component 108). For example, the one or more updates can be obtained continually, periodically, based on a trigger event, based on receipt of data from the mobile device, and so on. Upon or after collection of the updates, the method 800 can return to 804 and another decision can be made a usage parameter satisfies a defined usage parameter (e.g., via the analysis component 106). It is to be understood that the collection of updates, at 810, and the determination, at 804, such that any number of updates and/or changes to the demodulation reference sign design can be initiated.

Described herein are systems, methods, articles of manufacture, and other embodiments or implementations that can facilitate shared DMRS design in a 5G network. Facilitating shared DMRS design in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
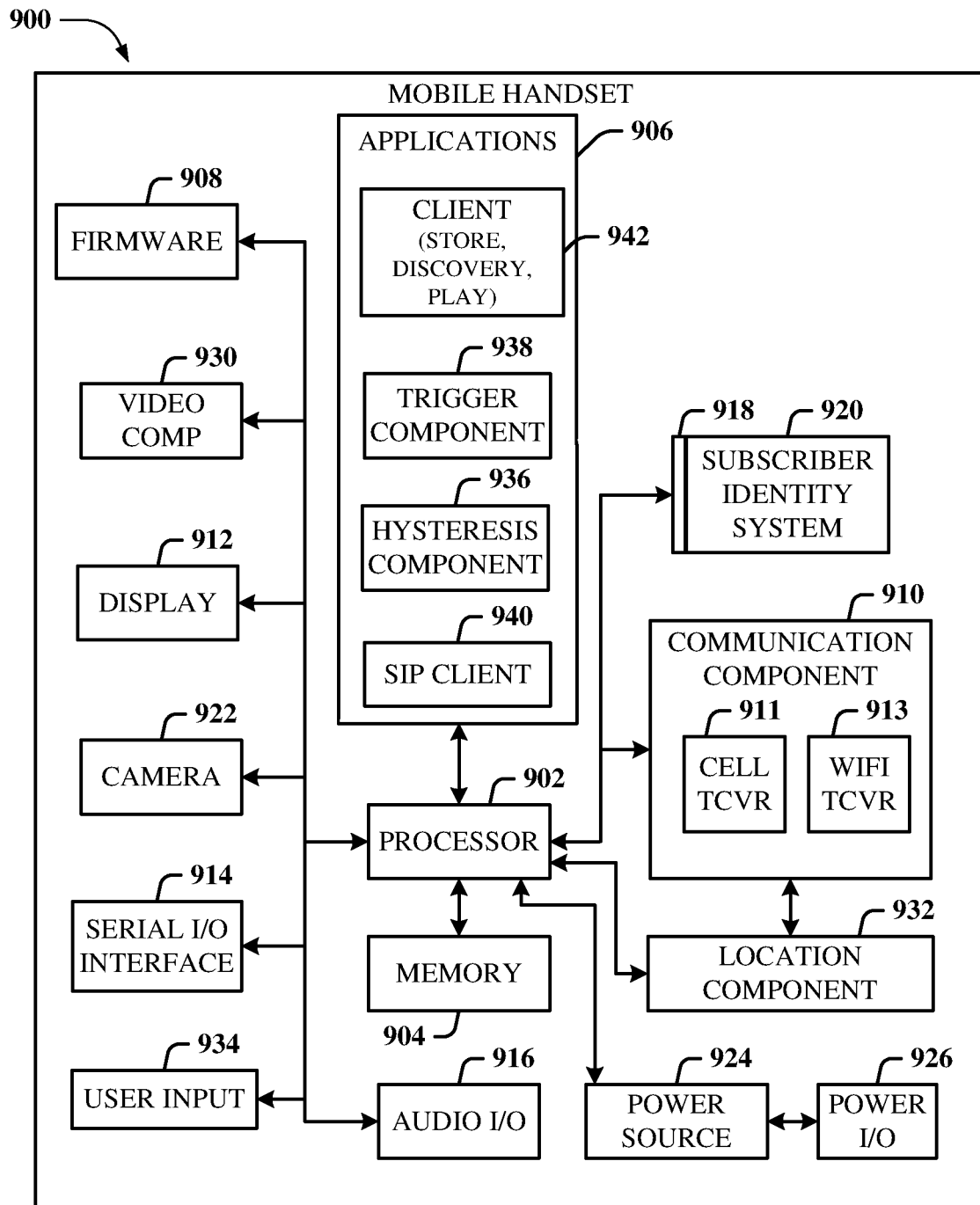
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
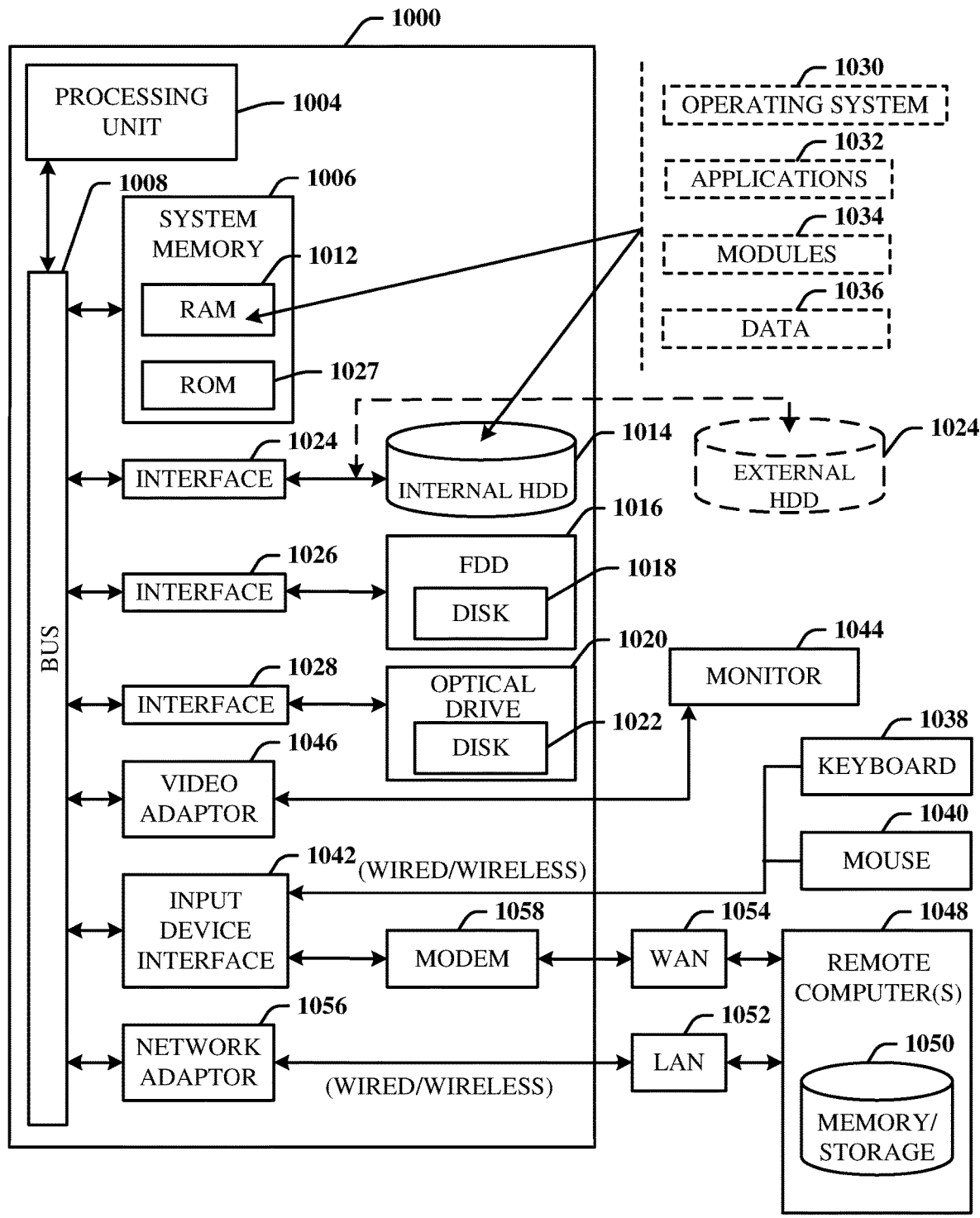
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by network equipment comprising a processor, that a usage parameter associated with a user equipment satisfies a function of a defined usage parameter associated with control channel demodulation reference signal reuse; and
   in response to a determination that the usage parameter satisfies the function of the defined usage parameter, transmitting, by the network equipment to the user equipment, an indication of usage of a shared demodulation reference signal for a data channel and a control channel.

2. The method of claim 1, wherein the indication of usage is a first indication, and wherein the method further comprises:
   in response to determining the usage parameter fails to satisfy the defined usage parameter, transmitting, by the network equipment to the user equipment, a second indication of usage of a first demodulation reference signal for the data channel and a second demodulation reference signal for the control channel.

3. The method of claim 2, wherein the first demodulation reference signal and the second demodulation reference signal are separate demodulation reference signals.

4. The method of claim 1, wherein the transmitting the indication of usage comprises transmitting the indication of usage as a separate encoded bit in a signal that comprises downlink control information.

5. The method of claim 1, wherein the determination is a first determination, wherein the usage parameter is a movement speed of the user equipment, and wherein the method further comprises:
measuring, by the network equipment, the movement speed of the user equipment;
comparing, by the network equipment, the movement speed with a defined movement speed parameter; and
in response to a second determination that the movement speed is less than the defined movement speed parameter, determining, by the network equipment, that the shared demodulation reference signal is available for use by the user equipment.

6. The method of claim 1, wherein the determination is a first determination, wherein the usage parameter is rank data, and wherein the method further comprises:
evaluating, by the network equipment, the rank data associated with the user equipment; and
in response to a second determination that the rank data is rank one, determining, by the network equipment, that the shared demodulation reference signal is available for use by the user equipment.

7. The method of claim 1, wherein the usage parameter is a duration of a physical downlink shared channel, and wherein the method further comprises:
determining, by the network equipment, the duration of the physical downlink shared channel; and
transmitting, by the network equipment to the user equipment, a demodulation reference signal port table based on the duration of the physical downlink shared channel, wherein the demodulation reference signal port table comprises the indication of usage for the user equipment to use the shared demodulation reference signal for the data channel and the control channel.

8. The method of claim 1, wherein the control channel demodulation reference signal reuse comprises a downlink control channel demodulation reference signal being reused for physical downlink shared channel estimation.

9. The method of claim 1, wherein the transmitting the indication of usage of the shared demodulation reference signal comprises transmitting an instruction to implement the control channel demodulation reference signal reuse as a jointly encoded bit in a demodulation reference signal port table that comprises a group of indication bits comprising the jointly encoded bit.

10. The method of claim 1, wherein the control channel demodulation reference signal reuse is implemented for slot-based scheduling.

11. The method of claim 1, wherein the control channel demodulation reference signal reuse is implemented for non-slot-based scheduling.

12. A system, comprising:
a processor; and
a memory that stores executable instructions that, when executed by the processor, facilitate performance of operations, comprising:
evaluating a usage parameter associated with a user equipment device as a function of a defined usage parameter associated with control channel demodulation reference signal reuse;
based on a first determination that the usage parameter satisfies the function of the defined usage parameter, conveying, to the user equipment device, a first indication of usage of a shared demodulation reference signal for a data channel and a control channel based on the determining; and
based on a second determination that the usage parameter fails to satisfy the function of the defined usage parameter, conveying, to the user equipment device, a second indication of usage of a first demodulation reference signal for the data channel and a second demodulation reference signal for the control channel.

13. The system of claim 12, wherein the operations further comprise:
transmitting the first indication of usage as a separate encoded bit in a signal that comprises downlink control information.

14. The system of claim 12, wherein the operations further comprise:
transmitting, with the first indication of usage, a third indication to implement the control channel demodulation reference signal reuse as a jointly encoded bit in a demodulation reference signal port table that comprises a group of indication bits comprising the jointly encoded bit.

15. The system of claim 12, wherein the first demodulation reference signal and the second demodulation reference signal are separate demodulation reference signals.

16. The system of claim 12, wherein the defined usage parameter is a movement speed of the user equipment device.

17. The system of claim 12, wherein the defined usage parameter is rank data of the user equipment device.

18. The system of claim 12, wherein the defined usage parameter is a duration of a physical downlink shared channel.

19. A non-transitory machine-readable medium, comprising executable instructions that, when executed by a processor, facilitate performance of operations, comprising:
in response to a first determination that a usage parameter associated with a user equipment satisfies a function of a defined usage parameter associated with control channel demodulation reference signal reuse, facilitating a first transmission to the user equipment, wherein the first transmission comprises a first indication of usage of a shared demodulation reference signal for a data channel and a control channel; and
in response to a second determination that the usage parameter fails to satisfy the function of the defined usage parameter, facilitating a second transmission to the user equipment, wherein the second transmission comprises a second indication of usage of a first demodulation reference signal for the data channel and a second demodulation reference signal for the control channel.

20. The non-transitory machine-readable medium of claim 19, wherein the operations further comprise:
transmitting, with the first indication of usage, a third indication to implement the control channel demodulation reference signal reuse as a jointly encoded bit in a demodulation reference signal port table that comprises a group of indication bits comprising the jointly encoded bit.

* * * * *